(12) United States Patent
Gagnon (10) Patent No.: US 8,879,615 B1
(45) Date of Patent: Nov. 4, 2014

(54) EQUALIZATION ADAPTATION USING TIMING DETECTOR

(71) Applicant: PMC-Sierra US, Inc., Sunnyvale, CA (US)

(72) Inventor: Mathieu Gagnon, Verdun (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/830,841

(22) Filed: Mar. 14, 2013

(51) Int. Cl.
*H04B 17/00* (2006.01)
*H04L 27/01* (2006.01)

(52) U.S. Cl.
CPC ........................... *H04L 27/01* (2013.01)
USPC ........... 375/226; 375/224; 375/229; 375/230; 375/231; 375/232; 375/233; 375/235; 375/236; 375/316

(58) Field of Classification Search
USPC .......... 375/316, 229, 230, 231, 232, 233, 236
See application file for complete search history.

(56) References Cited

U.S. PATENT DOCUMENTS

| | | | |
|---|---|---|---|
| 5,008,903 A | 4/1991 | Betts et al. | |
| 5,825,744 A | 10/1998 | Hutchins et al. | |
| 5,903,605 A * | 5/1999 | Crittenden | 375/226 |
| 6,546,047 B1 | 4/2003 | Chen et al. | |
| 6,975,674 B1 | 12/2005 | Phanse et al. | |
| 7,230,984 B2 | 6/2007 | Martin et al. | |
| 7,254,198 B1 | 8/2007 | Manickam et al. | |
| 7,301,997 B1 | 11/2007 | Wang et al. | |
| 7,305,028 B2 | 12/2007 | Balakrishnan et al. | |
| 7,474,990 B2 | 1/2009 | Kim | |
| 7,646,807 B1 | 1/2010 | Manickam et al. | |
| 7,756,228 B1 | 7/2010 | Manickam et al. | |
| 7,844,021 B2 | 11/2010 | Gibbons et al. | |
| 2008/0101515 A1 | 5/2008 | Yang | |
| 2009/0190643 A1 | 7/2009 | Kim | |
| 2010/0135378 A1* | 6/2010 | Lin et al. | 375/233 |

OTHER PUBLICATIONS

Gardner, "A BPSK/QPSK Timing-Error Detector for Sampled Receivers", IEEE Transactions on Communications, vol. COM-34, No. 5, 1986, pp. 423-429.

* cited by examiner

*Primary Examiner* — Siu Lee
(74) *Attorney, Agent, or Firm* — Dennis R. Haszko (57) ABSTRACT

An equalization adaptation circuit comprises an equalizer, a transition determination circuit, a phase error circuit, a sequence recovery circuit, a phase error accumulator circuit, a transition accumulator circuit, and a controller circuit. The equalizer has adjustable parameters. The transition determination circuit determines observed transitions in an equalized signal output from the equalizer. A phase error circuit determines phase errors of the observed transitions. A sequence recovery circuit generates recovered digital data sequences. A phase error accumulator circuit accumulates the phase errors in respective association with pre-defined patterns matching the recovered digital data sequences containing observed transitions corresponding to the phase errors. A transition accumulator circuit accumulates a number of the observed transitions. A controller circuit controls the adjustable parameters of the equalizer based upon the accumulated phase errors and number of observed transitions.

20 Claims, 8 Drawing Sheets

EQUALIZATION ADAPTATION USING TIMING DETECTOR

FIELD

The present disclosure relates generally to digital telecommunications. More particularly, the present disclosure relates to signal filtering and clock recovery in digital telecommunications.

BACKGROUND

Figure 1:
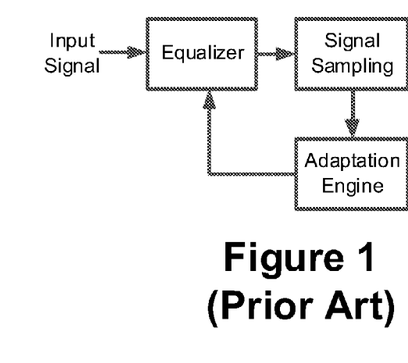
FIG. 1 is a schematic diagram of a known equalization adaptation circuit.

Digital communications often require timing information to be extracted from a data stream. This data stream is subject to the degradation of the communication channel medium. Since the timing information is shared with the data, it is subject to inter-symbol interference (ISI). This ISI requires filtering to optimize the clock recovery performance, such as in U.S. Pat. No. 6,975,676. A general, known equalization circuit is shown in FIG. 1.

The adaptation of the timing recovery equalization towards an optimal configuration often requires extracting additional information and complex processing, such as using least-mean-square (LMS) algorithms. Similar requirements exist for the data recovery.

Many of these methods are based on optimization of the amplitude opening of the eye (that is, the eye diagram appearing on an oscilloscope display in which a digital data signal from a receiver is repetitively sampled and applied to the vertical input, while the data rate is used to trigger the horizontal sweep, and which is typically referred to as the vertical eye opening); however, often times it is desirable to obtain a maximum eye opening in the time dimension (typically referred to as the horizontal eye opening).

Figure 2:
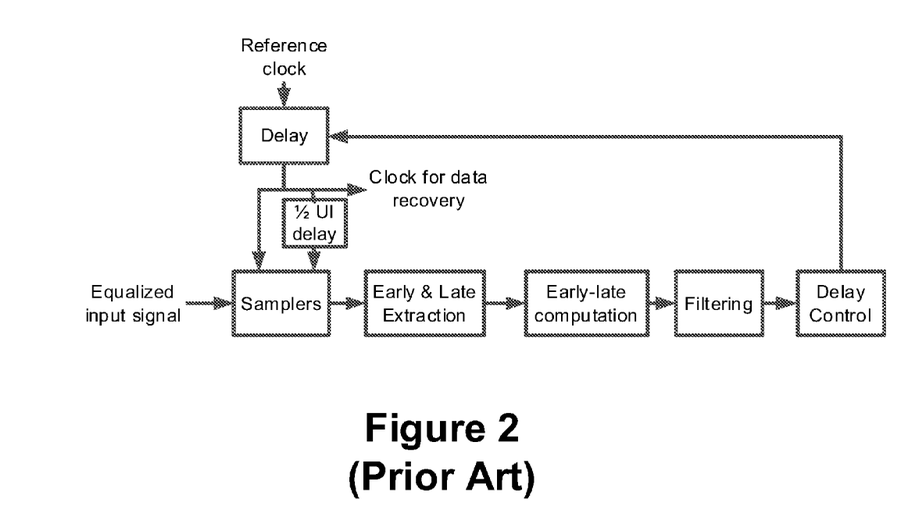
FIG. 2 is a schematic diagram of a known timing recovery circuit using delay control.
Figure 3:
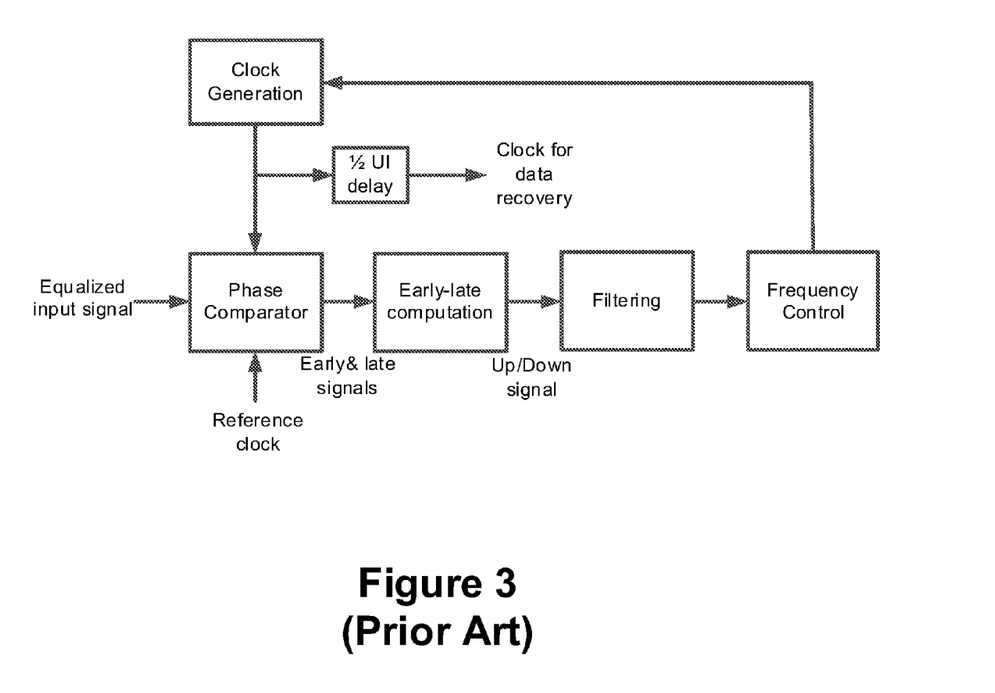
FIG. 3 is a schematic diagram of a known timing recovery circuit using a clock generation loop.

Different circuit topologies can be used to implement a timing recovery. For example, a known timing recovery circuit using delay control is shown in FIG. 2, and a known timing recovery circuit using a clock generation loop is shown in FIG. 3. Those skilled in the art will recognize that many other variations can be used.

Further circuits and methods are disclosed in U.S. Pat. Nos. 7,474,990 and 7,844,021, and United States Patent Application Publication No. 2008/0101515.

Known timing recovery and data recovery circuits for adapting the equalizer are complicated, however, resulting in significant power consumption and circuit area. Known methods focus on optimizing the vertical eye opening. Horizontal eye opening is, however, at least as important in many cases, especially for equalization of timing recovery circuits.

There is therefore a need for a method and apparatus to optimize equalization based on timing detection circuit outputs, and particularly one suitable for equalization not only of the timing recovery samples, but which can also be used for data equalization.

BRIEF DESCRIPTION OF THE DRAWINGS

Embodiments of the present invention will now be described, by way of example only, with reference to the attached Figures, wherein.

DETAILED DESCRIPTION

Generally, the present disclosure provides an equalization circuit and method based on the output information from a timing recovery circuit as well as a sequence detection circuit. Equalization parameters are adjusted based on observed transition phase errors associated with preselected bit sequences. The equalization circuit has a configuration that minimizes complexity, yet provides good performance, especially for equalizing signals later provided as inputs to timing recovery circuits.

In a first aspect, a method of adjusting an equalizer in a digital communications circuit has the following steps. At least one reference sequence for which equalization is to be optimized is selected. Each reference sequence contains a corresponding target bit transition. Phase error signals corresponding to observed transitions in an equalized signal are generated; the phase error signals indicate phase errors of the observed transitions relative to average transition timings. Transition signals are generated indicating the presence or absence of the observed transitions in unit intervals of the equalized signal. Recovered data sequences are generated from the equalized signal. For each reference sequence, the phase error signals corresponding to observed transitions contained in recovered data sequences matching the reference sequence are accumulated when the observed transitions match the target bit transition corresponding to the reference sequence. For each reference sequence, the transition signals are accumulated indicating a total number of the observed transitions in the equalized signal. The equalizer is adjusted according to a predefined metric function based on the accumulated phase error signals and the total number of the observed transitions for each selected digital sequence.

In a further aspect, the recovered data sequences are affected by the equalizer.

In a further aspect, the phase errors comprise early signals and late signals, and accumulating the phase error signals comprises accumulating differences between the early signals and the late signals.

In a further aspect, each phase error signal comprises an magnitude proportional to how early or late the corresponding observed transition is relative to a corresponding average transition timing, the phase error signal further having a sign indicating whether the corresponding observed transition is early or late relative to the corresponding average transition timing.

In a further aspect, accumulating the phase error signals and accumulating the total number of the observed transitions comprises accumulating the phase error signals and accumulating the total number of the observed transitions only for a sub-set of the observed transitions.

In a further aspect, the at least one reference sequence comprises at least two reference sequences as follows: 010 and 101, wherein the corresponding target bit transition is between the last two bits; and 110 and 001, wherein the corresponding target bit transition is between the last two bits.

In a further aspect, the at least one reference sequence comprises at least two reference sequences as follows: 101 and 010, wherein the corresponding target bit transition is between the first two bits; and 100 and 011, wherein the corresponding target bit transition is between the first two bits.

In a further aspect, the at least one reference sequence comprises a plurality of reference sequences comprising all sequences formable from a selected number of bits surrounding a common target bit transition. Each reference sequence is assigned a weight according to a number of transitions it contains. The predefined metric function is further based on the weights for the reference sequences.

In a further aspect, the metric function is based on a difference between: accumulated phase error signals corresponding to a first set of reference sequences, weighted and summed according to a frequency content of the first set of reference sequences; and accumulated phase error signals corresponding to a second set of reference sequences, weighted and summed according to a frequency content of the second set of reference sequences.

In a second aspect based on the first aspect, the phase error signals are accumulated for each corresponding reference sequence by a corresponding phase error signal accumulator, and the transition signals are accumulated for each corresponding reference sequence by a corresponding transition signal accumulator. The method further comprises the following steps. Prior to the step of generating phrase error signals, a first equalization parameters set is selected. Following the step of adjusting the equalizer, the phase error signal accumulators and the transition signal accumulators are reset. The steps from generating phrase error signals to resetting the phase error signal accumulators and the transition signal accumulator are repeated for a plurality of further equalization parameters sets. The equalization parameters set that corresponds to an optimal metric found is selected.

In a third aspect based on the first aspect, the phase error signals are accumulated for each corresponding reference sequence by a corresponding phase error signal accumulator. The transition signals are accumulated for each reference sequence by a corresponding transition signal accumulator. The method further comprises the following steps. Prior to the step of generating phase error signals, a first equalization parameters set is selected. Following the step of adjusting the equalizer, the phase error signal accumulators and the transition signal accumulators are reset. A new set of equalization parameters is computed based on a previous equalization parameter set and characteristics of past metric functions. The method is repeated.

In a further aspect based on the second or third aspects, the metric function is computed following the processing of a pre-defined number of bits.

In a further aspect based on the second or third aspects, the metric function is computed following the processing of a pre-defined number of transitions.

In a further aspect based on the second aspect, for each repetition a number of accumulations of the phase error signals and transition signals is increased.

In a further aspect based on the second aspect, the first equalization parameters set and each of the further equalization parameters sets is a different sub-set of a full equalization parameters set.

In a further aspect based on the second aspect, each one of the first equalization parameters set and the further equalization parameters sets is of progressively finer granularity and is distributed around an optimum equalization found in a preceding iteration.

In a further aspect based on the second aspect, in each repetition a number of accumulations performed by each of the accumulators is increased.

In a further aspect based on the second aspect, for each of the plurality of further equalization parameters sets, the repetitions continue until a stable equalization setting is found, and each next one of the further equalization parameters sets is characterized by a finer equalization step size.

In a fourth aspect, a computer program product comprises a computer-readable medium storing instructions executable by a computer to perform the methods.

In a fifth aspect, an equalization adaptation circuit comprises an equalizer, a transition determination circuit, a phase error circuit, a sequence recovery circuit, a phase error accumulator circuit, a transition accumulator circuit, and a controller circuit. The equalizer has adjustable parameters. The transition determination circuit determines observed transitions in an equalized signal output from the equalizer. Each observed transition comprises a crossing of the equalized signal output of a threshold relative to a nearest reference timing instant. The phase error circuit determines phase errors of the observed transitions. The sequence recovery circuit generates recovered digital data sequences. The phase error accumulator circuit accumulates the phase errors in respective association with pre-defined patterns matching the recovered digital data sequences containing observed transitions corresponding to the phase errors. The transition accumulator circuit accumulates a number of the observed transitions in respective association with the pre-defined patterns. The controller circuit controls the phase error accumulator circuit, the transition accumulator circuit, and the adjustable parameters of the equalizer based upon the accumulated phase errors and accumulated number of observed transitions.

Embodiments of the equalization circuit and method employ means for receiving as input recovered data samples and recovered edge samples, and outputting or generating phase errors therefrom. In some embodiments, the phase errors comprise early signals and late signals such as are generated by the front end of a Gardner detector (see, for example, F. M. Gardner, "A BPSK/QPSK timing-error detector for sampled receivers", IEEE Transactions on Communications, vol. COM-34, pp. 423-429 1986, the entirety of which is incorporated herein by reference). In this case, the early signal carries a value of 1 if a transition occurred earlier than the edge sampling reference, and a value of 0 if either no transition occurred or a transition occurred later than the edge sampling reference. The late signal carries a value of 1 if a transition occurred later than the edge sampling reference, and a value of 0 if either no transition occurred or a transition occurred earlier than the edge sampling reference.

Figure 4:
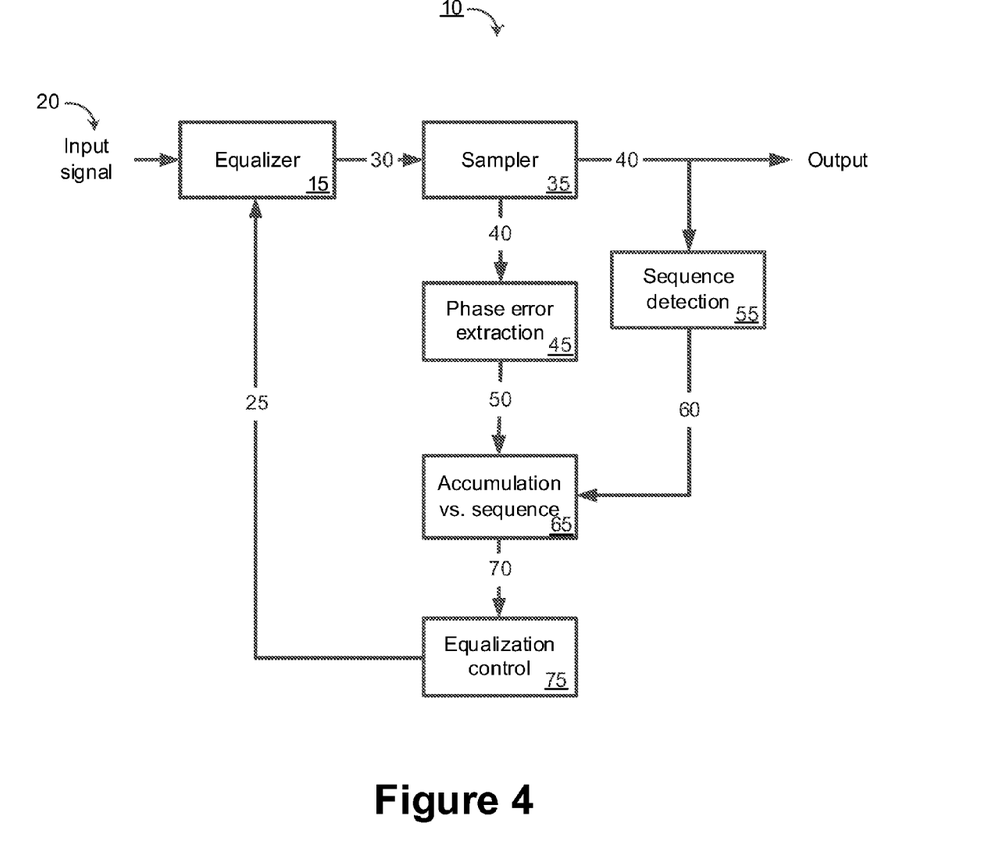
FIG. 4 is a schematic diagram of an equalization optimization circuit according to an embodiment.

One embodiment of an equalization circuit 10 is shown in FIG. 4. An equalizer 15 having programmable equalization parameters receives as input a digital signal to be recovered 20 as well as the current equalization parameters 25. It outputs an equalized signal 30. A sampler 35 receives as input the equalized signal 30 and outputs a recovered data sample 40. In one embodiment, the recovered data sample 40 comprises a recovered data sample associated with the center of the eye and a recovered edge sample associated with the edge of the eye.

A phase error extraction circuit 45 receives as input the recovered data sample 40 and outputs a phase error signal 50. In one embodiment, the phase error signal 50 comprises early signals and late signals as described above. In another embodiment, the phase error signal 50 comprises a difference between early signals and late signals. In a further embodiment, the phase error signal 50 comprises a signal indicating the presence of either an early signal or a late signal. In an embodiment, the phase error extraction circuit 45 may comprise the front end of a Gardner detector, described above, and the early and late signals 50 may comprise early signals and late signals.

In yet another embodiment, the phase error signal 50 comprises a positive value indicating an early transition or a negative value indicating a late transition. In one embodiment the magnitude of the value is fixed (such as a value of +1 to indicate an early transition and −1 to indicate a late transition). In another embodiment a magnitude of the value indicates a degree or magnitude of which the transition is early or late relative to a average transition timing. In an embodiment, a value of zero indicates no transition, while a non-zero value indicates a transition.

A sequence detection circuit 55 receives as input the recovered data sample 40 and outputs a code 60 corresponding to a matching digital sequence, if any, or to a code indicating no match. An accumulation versus sequence block 65 receives as input the phase error signals 50 and the code 60 and outputs for each matching digital sequence an accumulated phase error signal 70 which is an accumulation of the phase error signals 50 associated with the matching digital sequence corresponding to the code 60. In one embodiment, each accumulated phase error signal 70 comprises a total number of transitions observed and total numbers of early and late signals associated with the matching digital sequence corresponding to the code 60. In another embodiment, the accumulated phase error signal 70 comprises a sum of the phase error values associated with the matching digital sequence.

An equalization control circuit 75 receives the accumulated phase error signals 70 and adjusts the equalization parameters based on a metric function based on the accumulated phase error signal 70 for the different selected digital sequences.

Figure 5:
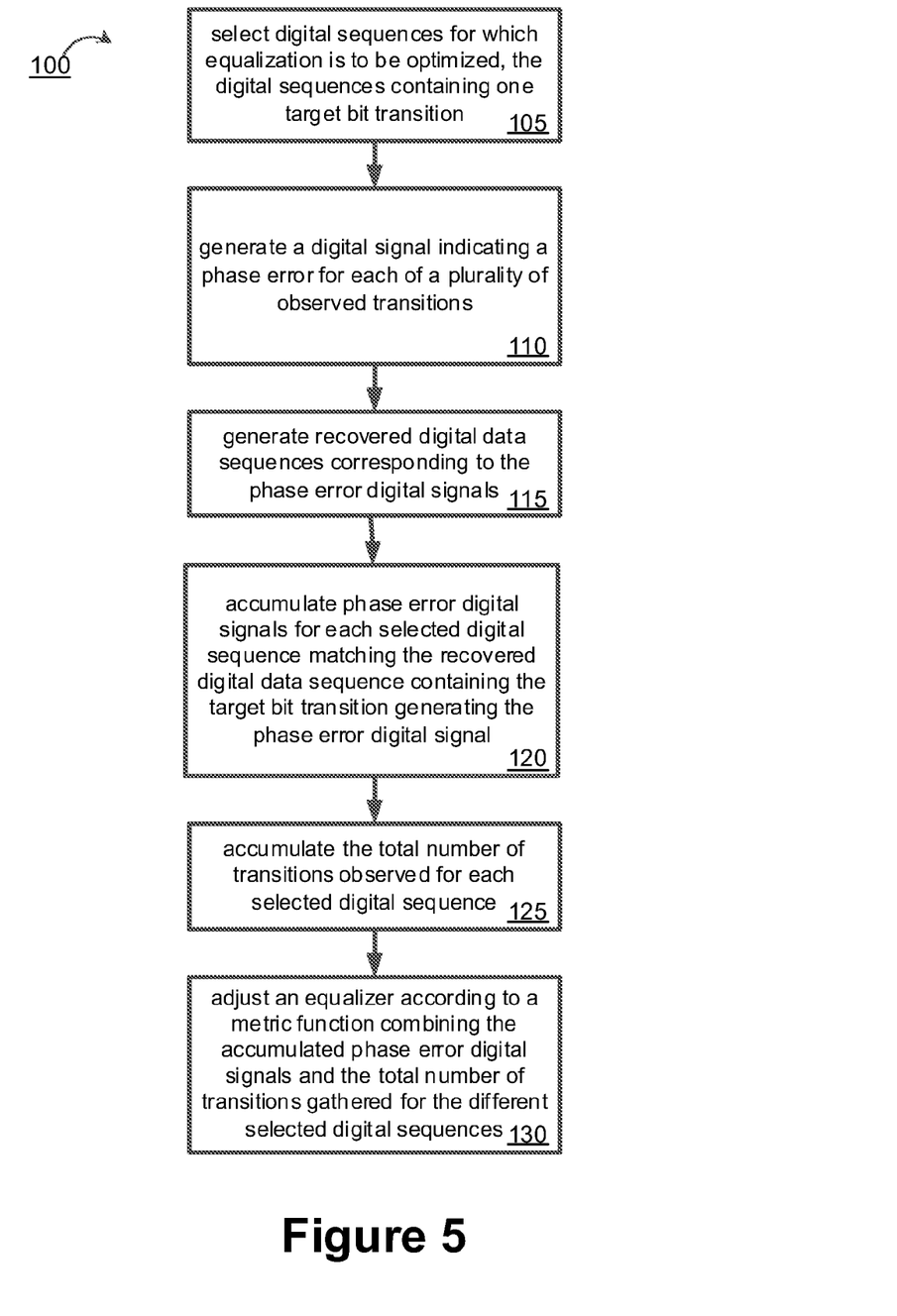
FIG. 5 is a flow chart of an equalization optimization method according to an embodiment.

One embodiment of an equalization method 100 is shown in FIG. 5. The equalization method 100 begins when at least one digital sequence for which equalization is to be optimized is selected, the digital sequences containing one target bit transition (step 105). In one embodiment, where a plurality of digital sequences are selected, each of the selected digital sequences contains the same target bit transition. In another embodiment, each selected digital sequence contains a corresponding target bit transition which may be the same or different from any other target bit transition.

A target bit transition may be characterized by the direction of transition, i.e. the values immediately preceding and following the transition (0 to 1, or 1 to 0, for example). A target bit transition may also be characterized by a location or bit position with the corresponding digital sequence (the transition between the second and third bits in the sequence, for example). A target bit transition may also be characterized by the characteristics of a sub-sequence in the digital sequence preceding or following the transition. For example, the target bit transition may be characterized by a transition frequency in a number of bits preceding the target bit transition.

A digital signal is generated indicating a phase error for each of a plurality of observed transitions recovered from a digital signal (step 110). The phase error may be determined with reference to some reference standard which in one embodiment is a running average of the transition timings. In one embodiment, the phase errors are early signals and late signals and generating the digital signal indicating the phase error comprises generating the early signals and late signals indicating whether each of a plurality of observed transitions recovered from the digital signal is early or late compared to an average transition location for each transition which may be a running average of transition timing.

Recovered digital data sequences corresponding to ones of the generated phase error digital signals are generated (step 115). In this case, a recovered digital data sequence is considered to correspond to a generated phase error digital signal when the phase error is generated from an observed transition which is a target bit transition in a selected digital data sequence matching the recovered digital data sequence. Thus, in one embodiment where the phase errors comprise early signals and late signals, a recovered digital data sequence corresponds to an early signal or late signal if that early signal or late signal was generated based on an observed transition bit which is a target bit transition in a selected digital data sequence matching that recovered digital data sequence.

The phase error digital signals are accumulated for each selected digital sequence matching the recovered digital data sequence containing the observed bit transition generating the phase error and which is a target bit transition for that selected digital sequence (step 120). Thus, in one embodiment, where the phase errors are early signals and late signals, a number of early signals and late signals for each selected digital sequence matching a recovered digital data sequence containing a target bit transition of the selected digital data sequence is accumulated, the transition producing the early and late signal being accumulated. A total number of transitions observed for each selected digital sequence is also accumulated (step 125).

An equalizer is adjusted according to a metric function combining the accumulated phase error digital signals and the total number of transitions gathered for the different selected digital sequences (step 130).

Figure 6:
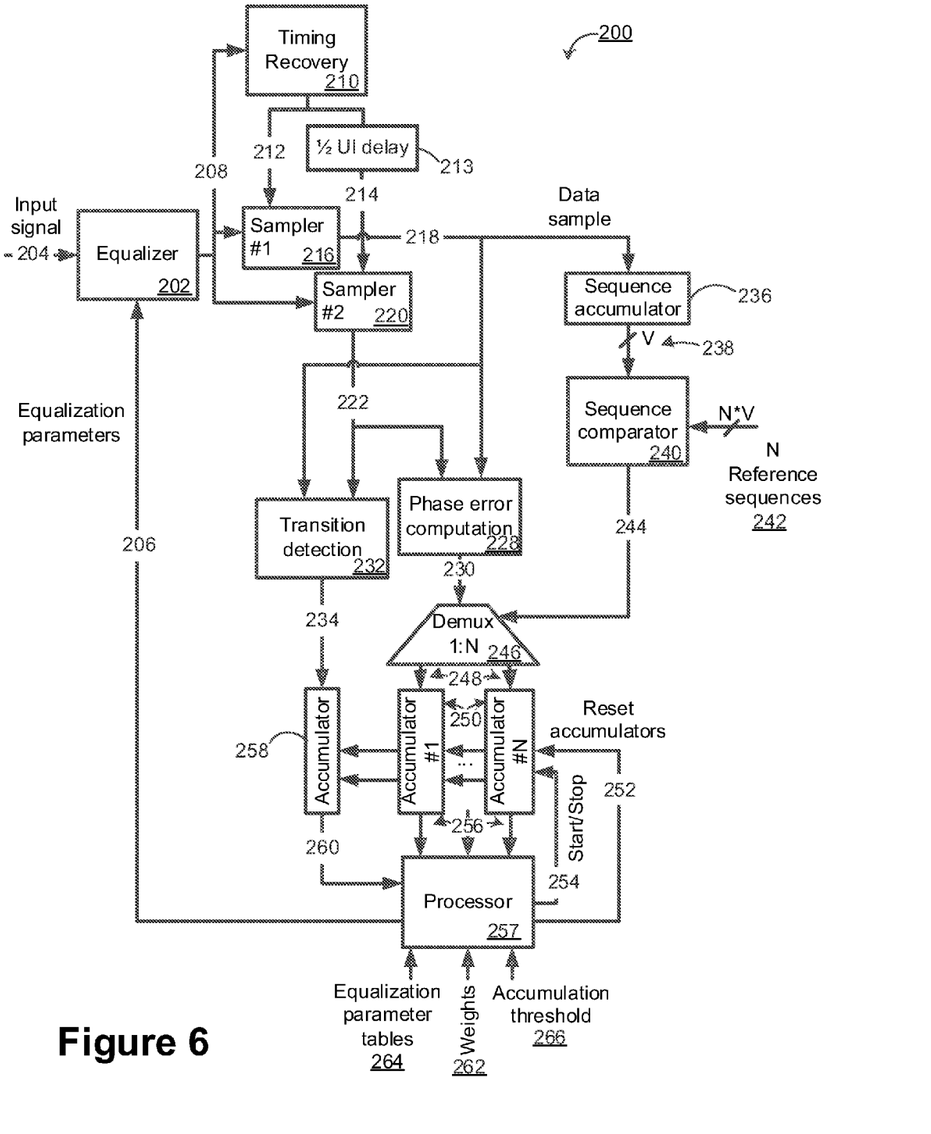
FIG. 6 is a schematic diagram of an equalization optimization circuit according to an embodiment.

One embodiment of an equalization circuit 200 is shown in FIG. 6. An equalizer 202, having programmable equalization parameters, receives as input the digital signal 204 to be recovered, and the current equalization parameters 206. It outputs an equalized signal 208.

It will be understood that the equalizer 202 may be a timing equalizer, a data equalizer, or both.

A timing recovery circuit 210 receives as input the equalized signal 208, and outputs a reference sampling signal 212 approximately synchronized with the center of the eye. A reference sampling signal shifted by ½ unit interval (UI) 214 is also generated by a ½ UI delay block 213. The shifted reference signal 214 is approximately synchronized with the edge of the eye. In one embodiment, the ½ UI delay block 213 inverts the polarity of the reference sampling signal 212 using an inverter.

A first sampler 216 receives as input the equalized signal 208 and the reference sampling signal 212 approximately synchronized with the center of the eye, and outputs a recovered data sample 218.

A second sampler 220 receives as input the equalized signal 208 and the shifted reference sampling signal 214 approximately synchronized with the edge of the eye, and outputs a recovered edge sample 222.

An phase error computation circuit 228 receives as input the recovered data sample 218 and recovered edge sample 222, and outputs a phase error signal 230. In one embodiment, the phase error computation circuit 228 is an early and late extraction circuit implemented as the front end of a Gardner detector, and generates early signals and late signals as described above. In one embodiment, the phase error circuit 228 outputs a difference of early and late signals determined as described above.

A transition detection circuit 232 receives the recovered data sample 218 and recovered edge sample 222 and outputs a transition signal 234 indicating the presence or absence of a transition. In one embodiment, a transition is determined based on three consecutive samples comprising a first recovered data sample, a first recovered edge sample, and a second recovered data sample. In an embodiment where the phase error computation circuit generates early signals and late signals, the transition detection circuit 232 may alternatively take as input the early signals and late signals from the phase error computation circuit 228 and determine a transition based on the presence of either an early signal or a late signal (by means of an OR function, for example).

A sequence accumulator 236 receives the recovered data signals 218, and accumulates them into a shift register. It outputs the values of this shift register as a V-bit sequence 238, where V is the number of bits in the digital sequence.

A sequence comparator 240 receives as input the current V-bit sequence 238 from the sequence accumulator 236, and a number (N) of V-bit reference sequences 242. It compares the current sequence with each reference sequence, and outputs a code 244 which corresponds to the matching sequence, if any, or indicates no match.

A de-multiplexer 246 takes as input the sequence code 244 and the phase error signal 230. It has outputs 248 connected to a plurality of accumulators 250, one for each reference sequence detected (N). The de-multiplexer 246 sends the current phase error signal 230 at the input to the output 248 corresponding to the current sequence code 244, and zero to others.

Each accumulator 250 takes as inputs:
  a) the phase error signal 230 from its assigned de-multiplexer 246 output 248;
  b) a reset signal 252; and
  c) a start/stop signal 254.

Each accumulator 250 comprises control logic, a summation unit, and a memory element (not shown) that holds and outputs the current accumulator value 256 to a processor 257. In an embodiment, the current accumulator value is a sum of accumulated phase error signals. In another embodiment, the current accumulator value is a sum of accumulated early signals and late signals. Other embodiments are possible.

When the reset signal 252 indicates reset, the control logic of each accumulator resets its memory element to zero, what also brings its output 256 to zero.

When the reset signal 252 does not indicate reset, and when the start/stop signal 254 indicates start, each accumulator 250 sums the phase error signal input from its assigned de-multiplexer output 248 with its previous value to create its current accumulator value 256.

When the reset signal 252 does not indicate reset, and when the start/stop signal indicates stop, each accumulator 250 keeps its output current accumulator value 256 constant, ignoring any input phase error signal at its assigned de-multiplexer output 248.

An additional accumulator 258 receives as input the transition detection output 234, in addition to the reset 252 and start/stop signals 254, and outputs its accumulated value 260 to the processor 257.

The processor circuit 257 receives as input the result of the accumulators 256, 260 a set of N weights 262, a table of equalization parameters 264 and an accumulation threshold value 266. It outputs a start/stop signal 254 and a reset signal 252 to the accumulators 250, 258, and also outputs the current equalization parameters 206 to the data equalizer 202.

In one embodiment, the processor circuit 257 outputs a common start/stop signal 254 and reset signal 252 to all of the phase error signal accumulators 250 and the transition detection accumulator 258. In another embodiment, the processor circuit 257 outputs a different start/stop signal 254 and reset signal 252 corresponding to each of the phase error signal accumulators 250 and the transition detection accumulator 258. Other combinations are possible.

In an embodiment, the processor circuit 257 implements the following sequential logic:
1) send the first entry of the equalization parameter table to the current equalization setting;
2) set the start/stop signal to stop;
3) assert the reset signal to the accumulators, wait for the reset to occur, and de-assert the reset signal;
4) set the start/stop signal to start;
5) monitor the output of the accumulated number of transitions until it reaches the accumulation threshold value;
6) set the start/stop signal to stop;
7) compute a partial metric value for each reference pattern as the product between the corresponding accumulated value and the corresponding weight;
8) compute the metric for the current equalization parameter as the absolute value of the sum of the partial metric values;
9) store the metric for the current equalization parameter into a memory element corresponding to the current equalization parameter set;
10) set the equalization parameters to the next entry of the equalization parameter table;
11) repeat steps 3) through 10) for each entry of the equalization parameter table; and
12) compare the metrics stored in the memory elements for each equalization parameter set, and output the equalization that corresponds to the smallest value.

Variations of this sequence can be made to represent the different methods described herein. In one embodiment, where the phase error signal comprises early signals and late signals, and the early and late signals are treated separately instead of a difference between them, then further circuitry may be added and the transition accumulation can instead count the number of bits received, which is usually equivalent to some time period.

In the equalization circuit 200 shown in FIG. 6, the equalizer affects the signal to the timing recovery circuit. Those skilled in the art will recognize that analysis may be desirable to promote loop stability and sufficient settling time when configuration is changed.

Persons skilled in the art will have knowledge of alternatives for various aspects and components of the equalization circuit 200. For example, delay elements can be implemented as phase interpolators taking as input a plurality of reference sampling signals with well-controlled phase alignments.

It will be appreciated that in the embodiments described herein, many of the blocks may have digital clock references that are not included, as well as other synchronization, reset and initialization signals that will be evident to those skilled in the art.

Figure 7:
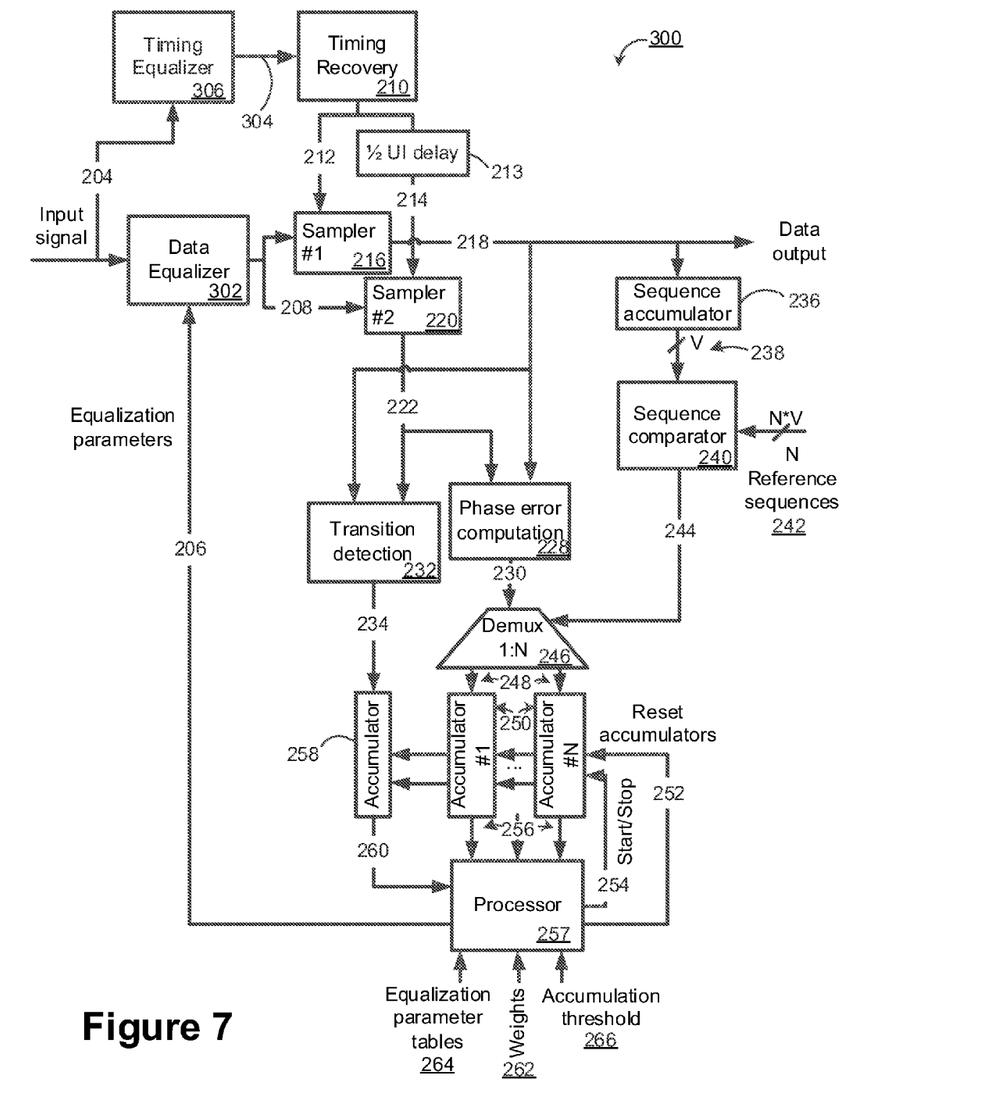
FIG. 7 is a schematic diagram of an equalization optimization circuit according to an embodiment for a data equalizer.

An embodiment of an equalization circuit 300 for controlling a data equalizer 302 is shown in FIG. 7. The circuit 300 is similar to that shown in FIG. 6 and described above, with the difference that the timing recovery circuit 210 receives its input 304 from a different filter, or timing equalizer 306, than the one being optimized by the present invention. In this case, the two loops are decoupled and the problems with loop stability and settling time disappear.

Those skilled in the art will recognize that further equalization can be provided after the data is sampled, to generate the data output 218. Those skilled in the art will also recognize that the timing equalizer 306 used for the timing recovery circuit 210 in FIG. 7 may be optimized by an instance of the circuit 200 shown in FIG. 6.

Figure 8:
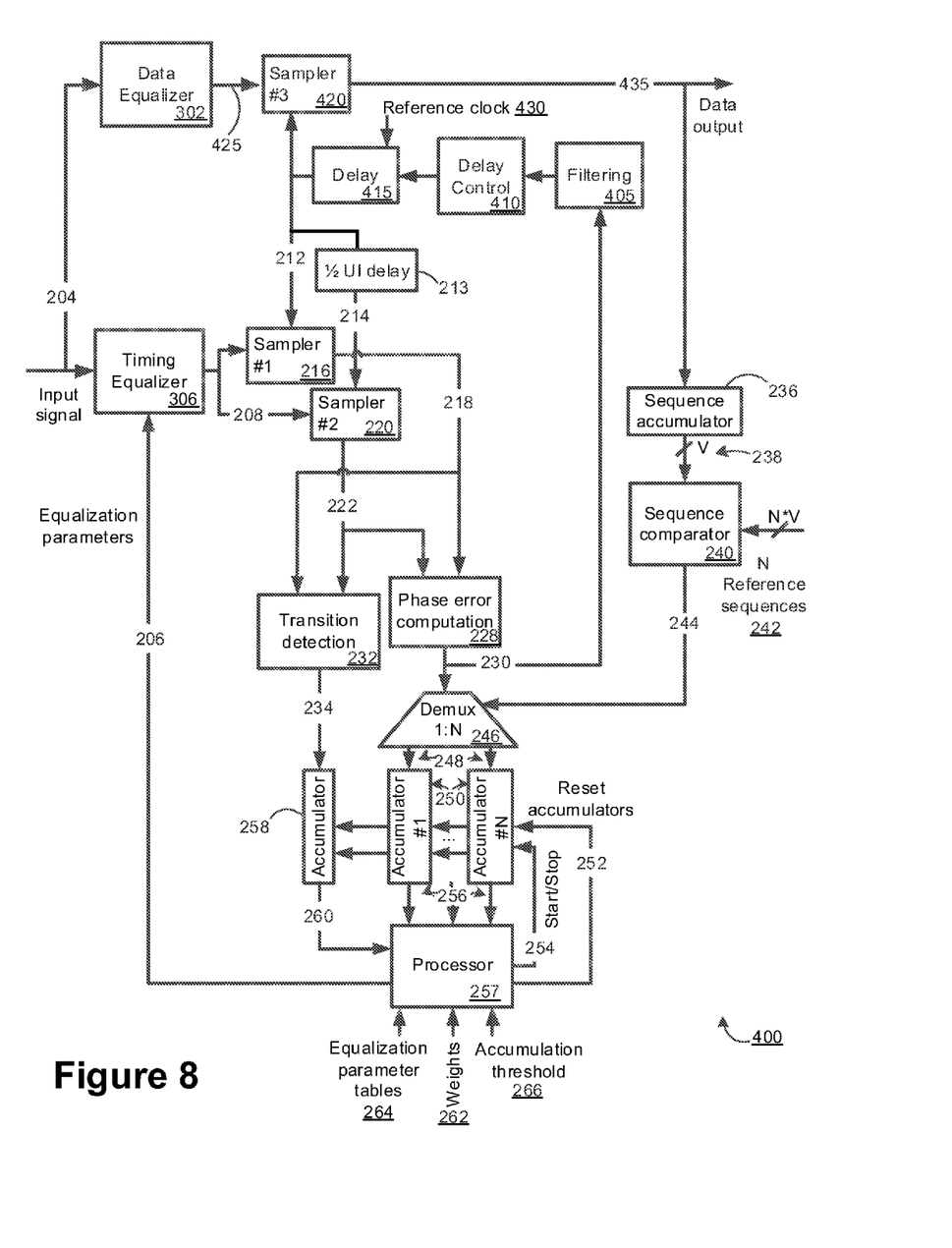
FIG. 8 is a schematic diagram of an equalization optimization circuit according to an embodiment for a timing equalizer.

FIG. 8 shows an equalization circuit 400 which is similar to the equalization circuit 200 shown in FIG. 6, but which incorporates aspects of the known timing detection circuit shown in FIG. 2, and wherein the sequence accumulator 236 is connected to the output of a data path instead of a timing path.

Thus, the input of the sequence accumulator 236 is changed from the output 218 of the first sampler 216 to the output 435 of a third sampler 420. This third sampler 420 receives as input the same sampling reference 212 as the first sampler 216, but its input is connected to the output 425 of a data equalizer circuit 302. The input of this data equalizer 302 is connected to the input signal 204.

The sampling reference 212 is provided by connecting the output 230 of the phase error computation circuit 228 to a filtering circuit 405, a delay control circuit 410 and a delay circuit 415. The delay circuit 415 inputs a reference clock 430 and outputs as the reference sampling signal 212 the same clock with a delay controlled by the input coming from the delay control circuit 410.

Those skilled in the art will recognize that the data equalizer circuit 302 in FIG. 8 can be optimized by an instance of the equalization circuit 300 shown in FIG. 7. In this case, in one embodiment, the sequence accumulator 236 and sequence comparator 240 blocks can be shared between the two instances of the circuits 300, 400. Furthermore, in one embodiment, the third sampler 420 in FIG. 8 serves as the first sampler 216 in FIG. 7, while the timing equalization 306 and timing recovery 210 circuits of FIG. 7 are implemented as the corresponding circuits of FIG. 8.

Figure 9:
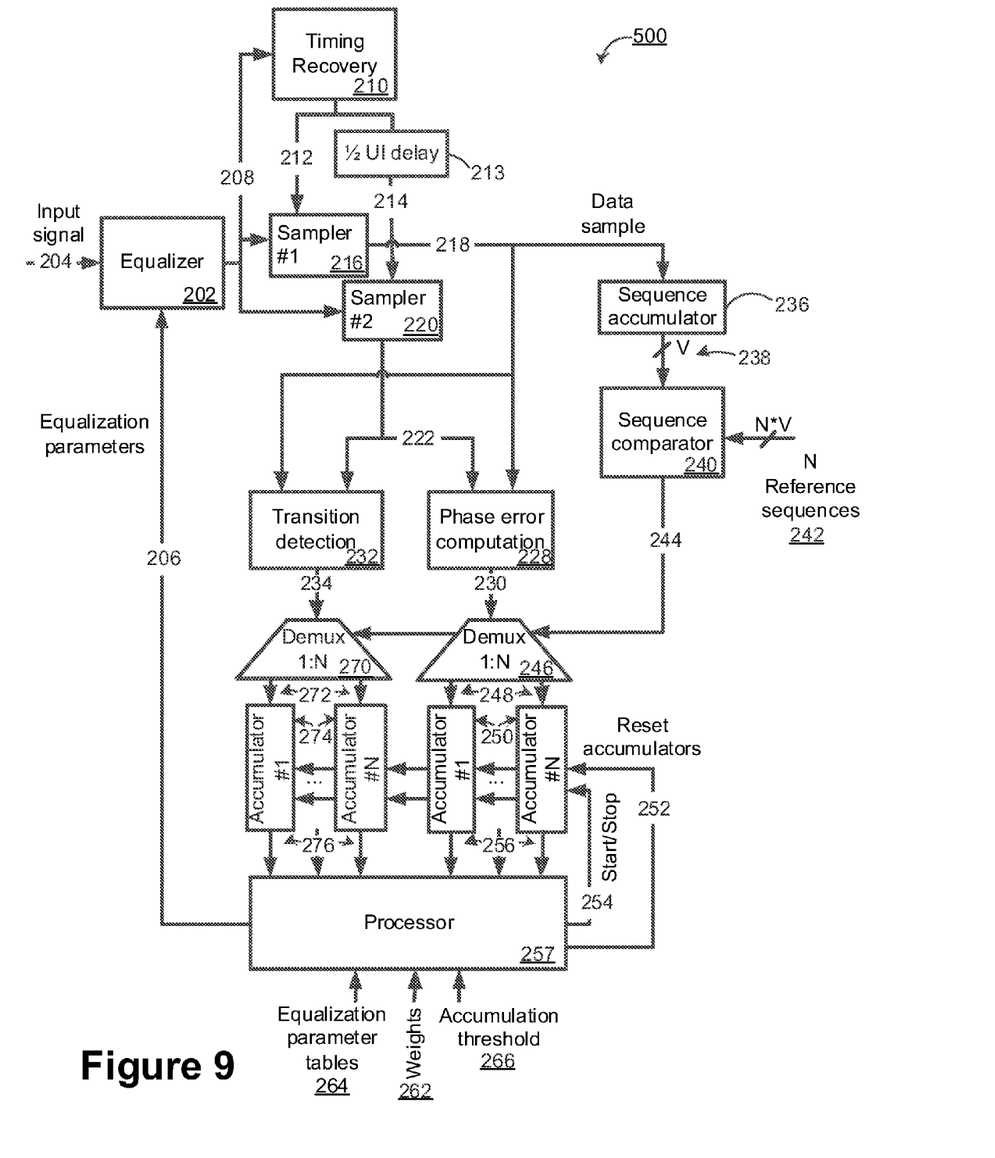
FIG. 9 is a schematic diagram of an equalization optimization circuit according to another embodiment.

FIG. 9 illustrates an embodiment of an equalization circuit 500 similar to the equalization circuit 200 shown in FIG. 6, but which contains a modification applicable to any of the other embodiments. Specifically, a further de-multiplexer 270 takes as input the sequence code 244 from the sequence comparator 240 as well as the transition signal 234 from the transition detection circuit 232, and similarly to the phase error de-multiplexer 246 has outputs 272 connected to a plurality of transition accumulators 274, one for each reference sequence detected (N). The transition de-multiplexer 270 sends the current transition signal 234 at the input to the output 272 corresponding to the current sequence code 244, and zero to others. The transition accumulators 274 function essentially similarly to the phase error accumulators 250, and thus each transition accumulator 274 comprises control logic, a summation unit, and a memory element (not shown) that holds and outputs the current accumulator value 276 to the processor 257.

The circuit 500 so modified thus accumulates the number of transitions observed for each one of the N reference sequences. The processor logic may thus function based on thresholds applicable to the numbers of transitions observed for each of the N reference sequences separately. For example, the sequential logic performable by the processor described above may include in step 5) monitoring the output of the accumulated number of transitions for each one of the N reference sequences until it reaches a threshold value particular to that reference sequence or common to a plurality or all of the reference sequences. Thus, the processor logic may be configured to cause the accumulation of phase errors for each of the N reference sequences until a minimum, threshold number of transitions for each of the reference sequences has been observed, before proceeding with steps 6) and following.

In an embodiment, the phase error information is generated and accumulated only for a sub-set of all the bit transitions.

In an embodiment, where the phase error signals are early signals and late signals, both early and late signals are accumulated for each transition. In an embodiment, the difference between early and late signals is accumulated.

In an embodiment, the number of accumulations before the equalizer is adjusted is controlled by a number of bits received.

In an embodiment, the number of accumulations before the equalizer is adjusted is controlled by a number of transitions received.

In an embodiment, the number of accumulations before the equalizer is adjusted is increased in subsequent iterations of the method, so as to provide an initial optimization more quickly, and refining it afterwards.

In an embodiment, all or some of the samplers are analog-to-digital converters.

Adjustment of an equalizer disclosed herein can be performed by many methods, including:

A. sweeping a plurality of pre-determined equalization settings to select the one having an optimal metric; and B. determining a change to apply to an equalizer based on the metrics.

It will be understood that an "optimal metric" may be that metric which results in a maximally open horizontal eye, a maximally open vertical eye, a combination thereof, a minimum bit error rate, or any other desirable measure known in the art. It will be understood, therefore, that, in general, the process of optimizing an equalizer consists in seeking an optimal metric and finding and applying the equalization parameters which produce it.

In one embodiment, the method described in A above involves the following steps:

1) applying an equalization setting;
2) computing the metric according to the present disclosure;
3) repeating steps 1) and 2) over all or a subset of all the pre-defined equalization settings; and
4) selecting the equalization setting that produces the optimum metric.

In some embodiments the method includes:

a) verifying for the presence of an optimum metric over a subset of equalization settings first, and continuing with another subset if no optimum is found; and b) starting from a subset of coarsely-spaced equalization settings, and refining with subsets of increasing granularity around the optimal point found in the previous subset.

In one embodiment, the method described in B above involves the following steps:

1) selecting a first equalization setting;
2) computing the metric as described herein; and
3) determining the change to apply to the equalization setting based upon the characteristics of the metric.

For example, the sign of the metric can be an indication whether the equalization setting has to evolve in one direction or another. The amplitude of the metric can be used to select the amount of change to apply.

Variations of this method also include computing the direction and magnitude from the difference between the metrics obtained previously. Methods A and B can also be combined, resulting, for example, in first limiting the subset of equalization settings to use through method A, and refining the results through method B.

Different data sequences and metric functions can be used to adjust the equalizer to an optimal setting. Examples of useful data sequences include:

A. selecting a first data pattern as a 3-bit pattern containing a transition before the bit transition being evaluated (i.e., 010 or 101, when evaluating transitions 10 or 01, respectively), and selecting a second data pattern as a 3-bit pattern not containing a transition before the bit being evaluated (i.e., 110 or 001, when evaluating transitions 10 or 01, respectively);

B. selecting a first data pattern as a 3-bit pattern containing a transition after the bit being evaluated (i.e., 101 or 010, when evaluating transitions 10 or 01, respectively), and selecting a second data pattern as a 3-bit pattern not containing a transition after the bit being evaluated (i.e., 011 or 100, when evaluating transitions 10 or 01, respectively); and C. selecting a first data pattern as a 4-bit pattern containing a transitions before the bit being evaluated (i.e., 1010 or 0101, when evaluating the last transition), and selecting a second data pattern as a 4-bit pattern not containing a transition before the bit being evaluated (i.e., 1110 or 0001, when evaluating the last transition).

Those skilled in the art will recognize that more patterns can be generated in this manner, with the intent to provide a first set of data pattern that represents high-frequency data (many transitions) and a second set that represents low-frequency data (few transitions). This concept can be extended to considering a plurality of patterns, and assigning them a weight corresponding to their frequency content. For example, the 8-bit pattern 10110101 would be weighted as a rather high-frequency-content-pattern, and pattern 11110001 would be weighted as a rather low-frequency-content pattern, with extremes being 8-bit patterns 10101010 and 11111110 for high and low frequency content, respectively, as well as their complement (i.e., 01010101 and 00000001).

Choosing patterns that discriminate between frequency contents may be employed, as this may serve as an indicator of the performance of the equalization filter, whose goal is to equalize the response of the channel. Those skilled in the art will recognize that any channel response can be expressed in the frequency domain, and thus responses to low and high-frequency-content data provide meaningful information to adjust the equalization filter.

Different functions can be used as metrics/metric functions to evaluate the equalization quality. Examples of useful functions include:

A. computing the difference between: a) the accumulated phase errors for a high-frequency pattern; b) the accumulated phase errors for a low-frequency pattern; and B. computing the sum of: a) the accumulated phase errors for a high-frequency pattern; b) the accumulated phase errors for a low-frequency pattern.

Those skilled in the art will recognize that other variants exist, especially taking the absolute value or square of the above examples. In some embodiments these functions are combined into a weighted sum to take advantage of their characteristics, or to selectively use one or the other depending upon the results over a subset of equalization settings.

In some embodiments where the phase error information is early and late information, the early and late information is generated in the form of a digital signal indicating only if the current signal transition is early or if it is late relative to an average reference. Other embodiments can provide early and late information that has variable amplitude according to how early or late the current signal transition is, relative to an average reference.

Other circuits, such as offset compensation circuits, are known to those skilled and can be added to the example embodiments provided herein.

Those skilled in the art will further recognize that many different implementations are possible, for example half rate implementations, variations of the timing recovery circuit implementation and of the equalization functions.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of adjusting an equalizer in a digital communications circuit, the method comprising:

a) selecting at least one reference sequence for which equalization is to be optimized, each reference sequence containing a corresponding target bit transition;

b) generating phase error signals corresponding to observed transitions in an equalized signal, the phase error signals indicating phase errors of the observed transitions relative to average transition timings;

c) generating transition signals indicating the presence or absence of the observed transitions in unit intervals of the equalized signal;

d) generating recovered data sequences from the equalized signal;

e) for each reference sequence, accumulating the phase error signals corresponding to observed transitions contained in the recovered data sequences matching the reference sequence when the observed transitions match the target bit transition corresponding to the reference sequence;

f) for each reference sequence, accumulating the transition signals indicating a total number of the observed transitions in the equalized signal; and g) adjusting the equalizer according to a predefined metric function based on the accumulated phase error signals and the total number of the observed transitions for each selected reference sequence.

2. The method according to claim 1, wherein the recovered data sequences are affected by the equalizer.

3. The method according to claim 1, wherein the phase errors comprise early signals and late signals, and accumulating the phase error signals comprises accumulating differences between the early signals and the late signals.

4. The method according to claim 1 wherein each phase error signal comprises an magnitude proportional to how early or late the corresponding observed transition is relative to a corresponding average transition timing, the phase error signal further having a sign indicating whether the corresponding observed transition is early or late relative to the corresponding average transition timing.

5. The method according to claim 1, wherein accumulating the phase error signals and accumulating the total number of the observed transitions comprises accumulating the phase error signals and accumulating the total number of the observed transitions only for a sub-set of the observed transitions.

6. The method according to claim 1, wherein the at least one reference sequence comprises at least two reference sequences as follows:
   010 and 101, wherein the corresponding target bit transition is between the last two bits; and
   110 and 001, wherein the corresponding target bit transition is between the last two bits.

7. The method according to claim 1, wherein the at least one reference sequence comprises at least two reference sequences as follows:
   101 and 010, wherein the corresponding target bit transition is between the first two bits; and
   100 and 011, wherein the corresponding target bit transition is between the first two bits.

8. The method according to claim 1 wherein:
   the at least one reference sequence comprises a plurality of reference sequences comprising all sequences formable from a selected number of bits surrounding a common target bit transition;
   each reference sequence is assigned a weight according to a number of transitions it contains; and
   the predefined metric function is further based on the weights for the reference sequences.

9. The method according to claim 1 wherein the metric function is based on a difference between:
   accumulated phase error signals corresponding to a first set of reference sequences, weighted and summed according to a frequency content of the first set of reference sequences; and
   accumulated phase error signals corresponding to a second set of reference sequences, weighted and summed according to a frequency content of the second set of reference sequences.

10. The method according to claim 1, wherein the phase error signals are accumulated for each corresponding reference sequence by a corresponding phase error signal accumulator, and wherein the transition signals are accumulated for each corresponding reference sequence by a corresponding transition signal accumulator, the method further comprising:

a.1) prior to step b), selecting a first equalization parameters set;

h) following step g), resetting the phase error signal accumulators and the transition signal accumulators;

i) repeating steps b) to h) for a plurality of further equalization parameters sets; and j) selecting the equalization parameters set that corresponds to an optimal metric found.

11. The method according to claim 1, wherein the phase error signals are accumulated for each corresponding reference sequence by a corresponding phase error signal accumulator, and wherein the transition signals are accumulated for each corresponding reference sequence by a transition signal accumulator, the method further comprising:

a.1) prior to step b), selecting a first equalization parameters set;

h) following step g), resetting the phase error signal accumulators and the transition signal accumulators;

i) computing a new set of equalization parameters based on a previous equalization parameter set and characteristics of past metric functions; and j) repeating steps b) to j).

12. The method according to claim 10 or 11 where the metric function is computed following a processing of a predefined number of bits.

13. The method according to claim 10 or 11 where the metric function is computed following a processing of a predefined number of transitions.

14. The method according to claim 10, wherein step i) further comprises, for each repetition of steps b) to h), increased a number of accumulations of the phase error signals and transition signals.

15. The method according to claim 10, wherein the first equalization parameters set and each of the further equalization parameters sets is a different sub-set of a full equalization parameters set.

16. The method according to claim 10, wherein each one of the first equalization parameters set and the further equalization parameters sets is of progressively finer granularity and is distributed around an optimum equalization found in a preceding iteration.

17. The method according to claim 10, wherein in each repetition of steps b) to h) a number of accumulations performed by each of the accumulators is increased.

18. The method according to claim 10, wherein for each of the plurality of further equalization parameters sets, steps b) to h) are repeated until a stable equalization setting is found, wherein each next one of the further equalization parameters sets is characterized by a finer equalization step size.

19. A non-transitory computer-readable medium storing instructions executable by a computer to perform the method according to claim 1.

20. An equalization adaptation circuit comprising:
   an equalizer with adjustable parameters;
   a transition determination circuit for determining observed transitions in an equalized signal output from the equalizer, wherein each observed transition comprises a crossing of the equalized signal output of a threshold relative to a nearest reference timing instant;
   a phase error circuit for determining phase errors of the observed transitions;
   a sequence recovery circuit for generating recovered digital data sequences;
   a phase error accumulator circuit for accumulating the phase errors in respective association with pre-defined patterns matching the recovered digital data sequences containing the observed transitions corresponding to the phase errors;

a transition accumulator circuit for accumulating a number of the observed transitions in respective association with the pre-defined patterns; and a controller circuit for controlling the phase error accumulator circuit, the transition accumulator circuit, and the adjustable parameters of the equalizer based upon the accumulated phase errors and the accumulated number of observed transitions.

* * * * *